US007270442B2

(12) United States Patent
Davenport et al.

(10) Patent No.: US 7,270,442 B2
(45) Date of Patent: Sep. 18, 2007

(54) SYSTEM AND METHOD FOR MONITORING STATUS OF A VISUAL SIGNAL DEVICE

(75) Inventors: David Michael Davenport, Niskayuna, NY (US); John Erik Hershey, Ballston Lake, NY (US); Todd Ryan Tolliver, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 386 days.

(21) Appl. No.: 10/955,631

(22) Filed: Sep. 30, 2004

(65) Prior Publication Data

US 2006/0066447 A1 Mar. 30, 2006

(51) Int. Cl.
*F21V 23/00* (2006.01)
*B60Q 11/00* (2006.01)

(52) U.S. Cl. .................. 362/276; 340/458; 246/473 R

(58) Field of Classification Search ........... 246/473 R; 340/458; 362/276
See application file for complete search history.

(56) References Cited

U.S. PATENT DOCUMENTS

| | | | | |
|---|---|---|---|---|
| 4,376,910 | A | 3/1983 | Peslier | |
| 4,775,865 | A * | 10/1988 | Smith et al. | 340/906 |
| 6,147,620 | A * | 11/2000 | Remmers et al. | 340/815.42 |
| 6,222,446 | B1 | 4/2001 | Hilleary | |
| 6,369,704 | B2 * | 4/2002 | Hilleary | 340/458 |
| 6,688,561 | B2 * | 2/2004 | Mollet et al. | 246/473.1 |
| 7,002,453 | B2 * | 2/2006 | Martinez | 340/438 |
| 2002/0000911 | A1 | 1/2002 | Hilleary | |
| 2004/0240208 | A1 * | 12/2004 | Beasley | 362/276 |

OTHER PUBLICATIONS

David Davenport, et al., "Method and Apparatus for monitoring and controlling warning systems", U.S. Appl. No. 10/248,120, filed Dec. 19, 2002.
David Davenport, et al, "Apparatus and Method for Monitoring the Output of a Warning or Indicator Light", U.S. Appl. No. 10/882,033, filed Jul. 1, 2004.
David Davenport, et al "Apparatus and Method for Monitoring the Output of a Warning or Indicator Light", filed Jul. 26, 2004.

* cited by examiner

*Primary Examiner*—Richard A. Rosenberger
(74) *Attorney, Agent, or Firm*—Paul J. DiConza; William E. Powell, III

(57) ABSTRACT

System and method for monitoring status of a visual signal lamp. The system includes at least one optical fiber comprising a first end and a second end. The first end is positioned proximate to the signal lamp and is oriented to capture a portion of light signal emitted by the signal lamp when the signal lamp is illuminated. The system also includes a photodetector positioned proximate to the second end of the optical fiber and configured to receive the portion of light signal. The system further includes a threshold detection circuitry connected to the photodetector and configured to detect a lighting parameter in relation to the signal lamp according to a predetermined criterion.

55 Claims, 5 Drawing Sheets

SYSTEM AND METHOD FOR MONITORING STATUS OF A VISUAL SIGNAL DEVICE

BACKGROUND

This invention relates generally to a system and method for detection of signal light parameters, and more particularly to a system and method for detecting and reporting railroad signal light status.

Visual railway signals, particularly signal lamps, are important components of a modern railway system and its operation. It is desirable to be able to verify that a signal lamp is in its desired state, illuminated, dark, or flashing, i.e., periodically cycling between illuminated and dark states. It is also desirable to detect and quantify the optical power exiting the signal head. Such optical power can be reduced by several factors including bulb age, dirt on lens or reflector surfaces, and damage to lens. Previous methods monitor the current drawn by a signal lamp to detect loss of filament. Such methods do not provide insight as to the condition of the entire optical system of the signal unit (i.e. lens, reflectors). Newer methods of monitoring flashing warning lights in railroad applications primarily involve incorporating lamp status determination systems positioned at the site of the visual signal lamp that report the determined signal lamp status to a remote monitoring point. These methods are generally labor intensive to install and to calibrate and do not provide a reliable, unambiguous, long-term indication of lamp performance.

These methods have their own inherent inaccuracies and delays and it would be desirable if these inaccuracies and delays are reduced or eliminated. There is therefore need for a system and a method based on transportation of actual light signals from the site of the signal lamp to a remotely located processing and monitoring point to allow more complex, thorough, direct and upgradeable decision logic to be performed.

BRIEF DESCRIPTION

Briefly, in accordance with one embodiment of the invention, there is provided a system for monitoring status of a visual signal lamp. The system includes at least one optical fiber comprising a first end and a second end. The first end is positioned proximate to the signal lamp and is oriented to capture a portion of light signal emitted by the signal lamp when the signal lamp is illuminated. The system also includes a photodetector positioned proximate to the second end of the optical fiber and configured to receive the portion of light signal. The system further includes a threshold detection circuitry connected to the photodetector and configured to detect a lighting parameter in relation to the signal lamp according to a predetermined criterion.

In accordance with another embodiment of the invention, there is provided a method for monitoring status of a visual signal lamp. The method includes positioning at least one optical fiber proximate to the signal lamp and orienting the at least one optical fiber to capture a portion of light signal emitted by the signal lamp when the signal lamp is illuminated. The method also includes capturing a portion of light signal emitted by the signal lamp using the at least one optical fiber when the signal lamp is illuminated. The method further includes detecting a lighting parameter in relation to the signal lamp according to a predetermined criterion.

DRAWINGS

DETAILED DESCRIPTION

Figure 1:
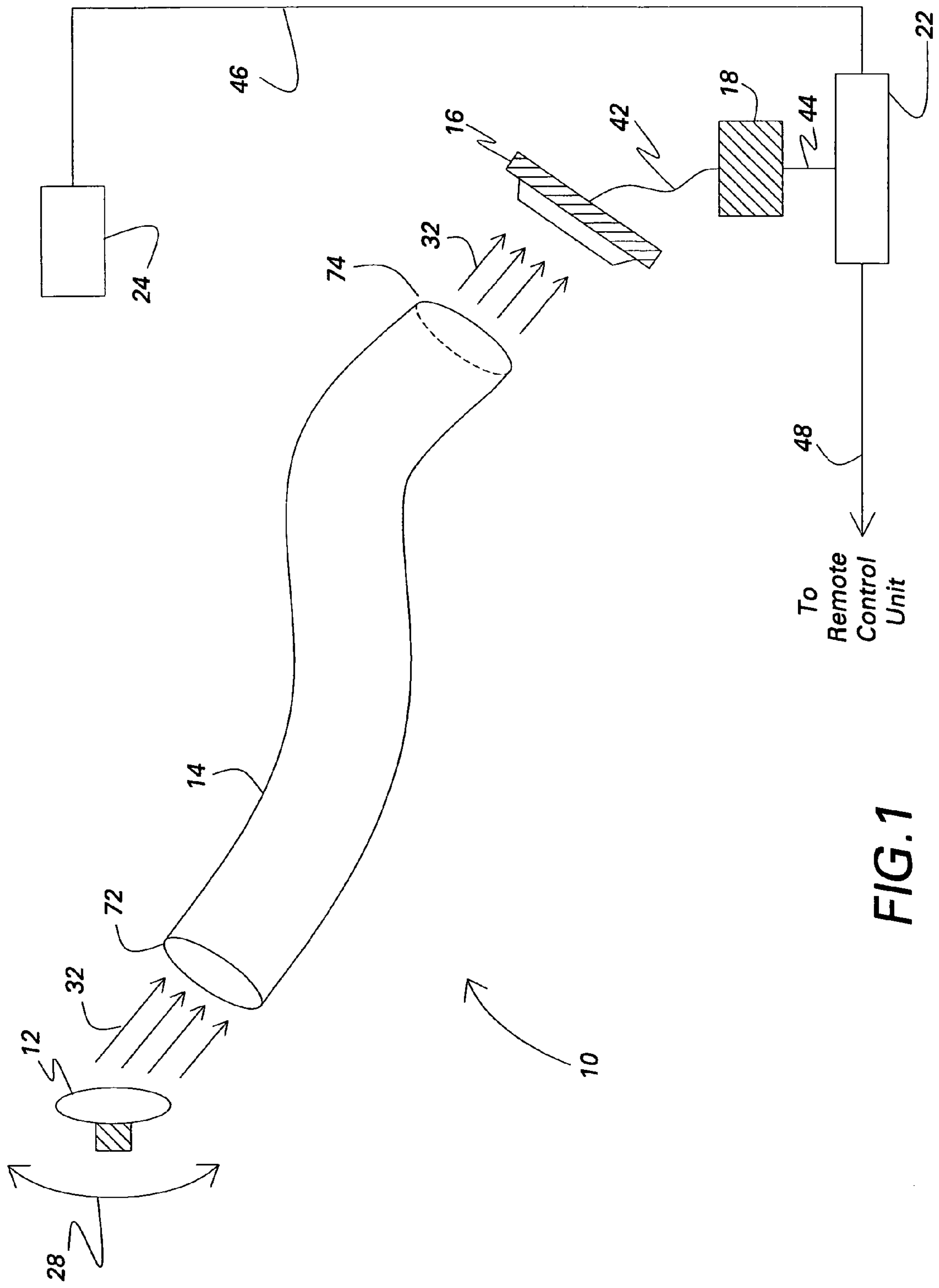
FIG. 1 is a schematic diagram of an exemplary system for monitoring status of visual signal lamp in accordance with one embodiment of the invention.

FIG. 1 is a schematic diagram of an exemplary system 10 for monitoring the status of a visual signal lamp 12 in accordance with one embodiment of the invention. The system 10 includes an optical fiber 14 to capture and transport light signals 32 emanated by the signal lamp 12 and a photodetector 16 to sense the optical power of the light signals 32 captured and transported by the optical fiber 14. The system 10 also includes a threshold detection circuitry 18 that compares the output of the photodetector 16 with a reference threshold value. The status of the signal lamp 12 is determined remotely and directly by the combination of the photodetector 16 and the threshold detection circuitry 18. In this embodiment of the invention, the signal lamp 12 is an incandescent bulb with a reflector 28. In another embodiment of the invention, the signal lamp 12 is an array of light emitting diodes (LEDs).

The optical fiber 74 described in this embodiment is a fiber typically used to transmit all types of optical signals (i.e. data and communication signals) over distances. In one embodiment of the invention, the optical fiber 74 is a standard optical fiber, which is a very thin strand of ultra-pure glass and having three concentric layers of material. The innermost layer is known as 'core' (not shown) and is made of glass forms. Light pulses pass through this glass core. The middle layer is known as 'cladding' (not shown). This layer is also made of glass, but of a different grade as compared to the material of the core. The outer most layer is the 'coating' (not shown), made of plastic. The cladding reflects the light from the core in a 'total internal reflection' mode and thus serves as a barrier to keep the light within the core, functioning much like a mirroring surface. The coating is there only to provide mechanical strength and protection to the optical fiber 14. The exact dimensions of the three layers will depend on the particular intended application and the amount of protection of the fiber required. In certain embodiments, the core diameter is on the order of about 200 micron and the outer diameter is on the order of about 900 microns to about 1 centimeters. In operation, the optical fiber 14 acts like a virtual tube and light signals pass through the center of the optical fiber 14.

Referring to FIG. 1, the optical fiber 14 has a first end 72 and a second end 74. The first end 72 is positioned proximate to the signal lamp 12 to capture a portion of the light signals 32 emanating from the signal lamp 12. As used herein, "proximate" means sufficiently close to allow for efficient capture of light. The exact distance between first end 72 and signal lamp 12 will depend on the particular characteristics of the lamp 12 and the fiber 14 used in the application. In certain embodiments, this distance is on the order of about 25 millimeters. The signal lamp 12, in some embodiments, is enclosed in a lamp housing (not shown) and in one embodiment of the invention, the first end 72 of the optical fiber 14 is positioned inside the housing. In another embodiment of the invention, the first end 72 of the optical fiber 14 is positioned outside the housing such that the light signals 32 travel from the source signal lamp 12, off the reflector 28 (for incandescent bulbs only) or through the colored (red, yellow, green) lens (not shown) for LED bulbs, into the optical fiber 14. In this case, the distance between the light source 12 and the first end 72 of the optical fiber 14 is on the order of 250 mm. In operation, when illuminated, the signal lamp 12 emits light signals 32 and a portion of the light signals 32 enter the first end 72 of the optical fiber 14 and is transported by the optical fiber 14 to its second end 74. The light signals 32 coming out of the second end 74 of the optical fiber 14 are then radiated onto the photodetector 16.

The photodetector 16 as shown in FIG. 1 is a device capable of converting an incident optical signal into an electrical signal and there are a number of lighting parameters, which can be discerned from the light signals 32 traveling through the optical fiber 14 and quantified by the photodetector 16. In operation, the photodetector 16 provides an electrical output proportional to the incident optical power of the light signals 32. The incident optical power can be related to the intensity or irradiance of the signal lamp 12 and from the known values of the electrical output of the photodetector 16, decisions can be made whether the level of intensity is within nominal bounds of a minimum and a maximum value. At the same time, the flash rate of the signal lamp 12 can also estimated because the optical power incident on the photodetector 16 varies as the bulb flashes.

The photodetector 16 of the system 10 may be embodied in several ways. In one embodiment of the invention, the photodetector 16 is a photodiode. As is well known in the art, a photodiode is a p-n junction designed to be responsive to optical input. Typically, photodiodes can be used in either zero bias or reverse bias. In zero bias, light falling on the diode causes a voltage to develop across the device, leading to a current in the forward bias direction. In the other case, when reverse biased, diodes usually have extremely high resistance. This resistance is reduced when light of an appropriate frequency shines on the junction. Hence, a reverse biased diode is also used as a photodetector by monitoring the current running through it.

In another embodiment of the invention, the photodetector 16 is a phototransistor. As is commonly known, a phototransistor is in essence a normal bipolar transistor that is encased in a transparent case so that light can reach its base-collector diode. A phototransistor works like a photodiode, but with a much higher sensitivity for light, because the electrons that tunnel through the base-collector diode are amplified by the transistor function.

In yet another embodiment of the invention, the photodetector 16 is a photomultiplier. Photomultipliers are extremely sensitive detectors of light in the ultraviolet, visible and near-infrared frequency range. They are a type of vacuum tube in which photons produce electrons in a photocathode in consequence of a photoelectric effect and these electrons are subsequently amplified by multiplication on the surface of dynodes. A signal is produced on the anode of the device. Amplification can be as much as $10^8$, meaning that measurable pulses can be obtained from single photons. The combination of high gain, low noise, high frequency response and large area of collection make a photomultiplier a very effective photodetector.

Referring back to FIG. 1, the threshold detection circuitry 18 detects a lighting parameter such as brightness or intensity or irradiance in relation to the signal lamp 12. The threshold detection circuitry 18 is a mixed signal device that is in communication with an input device. There is a predetermined reference value of control voltage or current configured as the threshold for reference. The threshold detection circuitry 18 is configured to compare an output of the input device with the predetermined threshold and determine whether the direct voltage or current output of the input device falls outside of the predetermined reference value. The input device in this embodiment of the invention is the photodetector 16 and the threshold detection circuitry 74 converts the direct voltage output of the photodetector 16 into a measure of the optical power incident on the photodetector 16. That, to a large extent, correlates to a number of lighting parameters such as intensity, brightness, and irradiance in relation to the signal lamp 12.

In operation, the threshold detection circuitry 18 is sensitive to a significant change in light signal from the signal lamp 12. The change may be a decrease in the light signal caused by malfunction of the light bulb or accumulation of dirt and/or dust on the bulb and/or the lens and/or the reflector. In another situation, the change in light signal may be an increase in the light signal. An increase in light signal may occur due to a damage of the reflector 28 or lens (not shown) such that more light reaches the first end 72 of the optical fiber 14. Increase in light signal level may also result from bright external sources such as sunlight, automobile headlights, etc. Moreover, an increased light signal level can also be caused by a bulb malfunction. The threshold detection circuitry 18 recognizes such conditions as fault conditions and takes measures for remedial action. This way, the threshold detection circuitry 18 applies a two-sided (high and low) threshold to the nominal signal. When the lighting parameter such as intensity or brightness or irradiance of the signal lamp 12 are sensed to go beyond predetermined acceptable limits, the threshold detection circuitry 18 sends a signal to the logical processor 22.

Referring to FIG. 1 again, the system 10, in certain embodiments, further includes a logical processor 22 and an alerting system 24. A logical processor typically is a processing unit that performs computing tasks and it is created using software application programs or operating system resources. In other instances, it may also be simulated by one or more physical processor(s) performing scheduling of processing tasks for more than one single thread of execution thereby simulating more than one physical processing unit. The logical processor 22 in FIG. 1 processes the result of comparison done by the threshold detection circuitry 18 and the alerting system 24 that is used to alert a control unit based on the logical processing of the logical processor 22. As illustrated in FIG. 1, the photodetector 16 is electrically coupled to the threshold detection circuitry 18 by electrical conductor 42. The threshold detection circuitry 18 in turn is connected to the logical processor 22 by electrical conductor 44. The logical processor 22 aids the threshold detection circuitry 18 in estimating a lighting parameter such as, brightness or intensity or irradiance status of the signal lamp 12 based on the strength of the output signal from the photodetector 16 and reports its estimate to a remote control unit (not shown) via an electrical conductor 48 or to an alerting system 24 via an electrical conductor 46. In an alternative embodiment of the invention, the electrical conductors 46 and 48 may be replaced by data links suitable for wired or wireless or fiber optic communication. Thus, a number of lighting parameters such as intensity, brightness, and irradiance in relation to the signal lamp 12 are remotely and directly determined by the combination of the photodetector 16, the threshold detection circuitry 18 and the logical processor 22.

As described above, the logical processor 22, in this embodiment of the invention, determines and interprets the status of the signal lamp 12 based on the output signal of the threshold detection circuitry 18. The determination and interpretation by the logical processor 22 is done in accordance with a predetermined criterion. For instance, in one embodiment of the invention, the predetermined criterion is a binary comparison of the optical power of the light signals 32 with a predetermined threshold value of intensity. In another embodiment of the invention, the predetermined criterion is comparison of the optical power of the light signals 32 with a predetermined maximum value of intensity. In yet another embodiment of the invention, the predetermined criterion is comparison of the optical power of the light signals 32 with a predetermined minimum value of intensity. Whatever be the criterion for comparison, if the sensed intensity of light signals 32 falls outside of the predetermined threshold, the logical processor 22 determines that the status of the signal lamp is not acceptable and the signal lamp 12 needs attention. In that event, the logical processor 22 sends an alarm signal to the alerting system 22 through the electrical conductor 46 and the alerting system 22 in turn generates an appropriate alarm to a remote location (not shown). Otherwise, the operating status of the signal lamp 12 is determined by logically processing one or more lighting parameters such as brightness or intensity or irradiance of signal lamps 12. In another embodiment of the invention, the logical processor 22 is programmed to keep track of the increase and decrease of the illumination caused by the flashing of the signal lamp 12. The logical processor 22, in this embodiment of the invention, also alerts the alerting system 24 when the flash rate goes beyond nominal and expected bounds.

Figure 2:
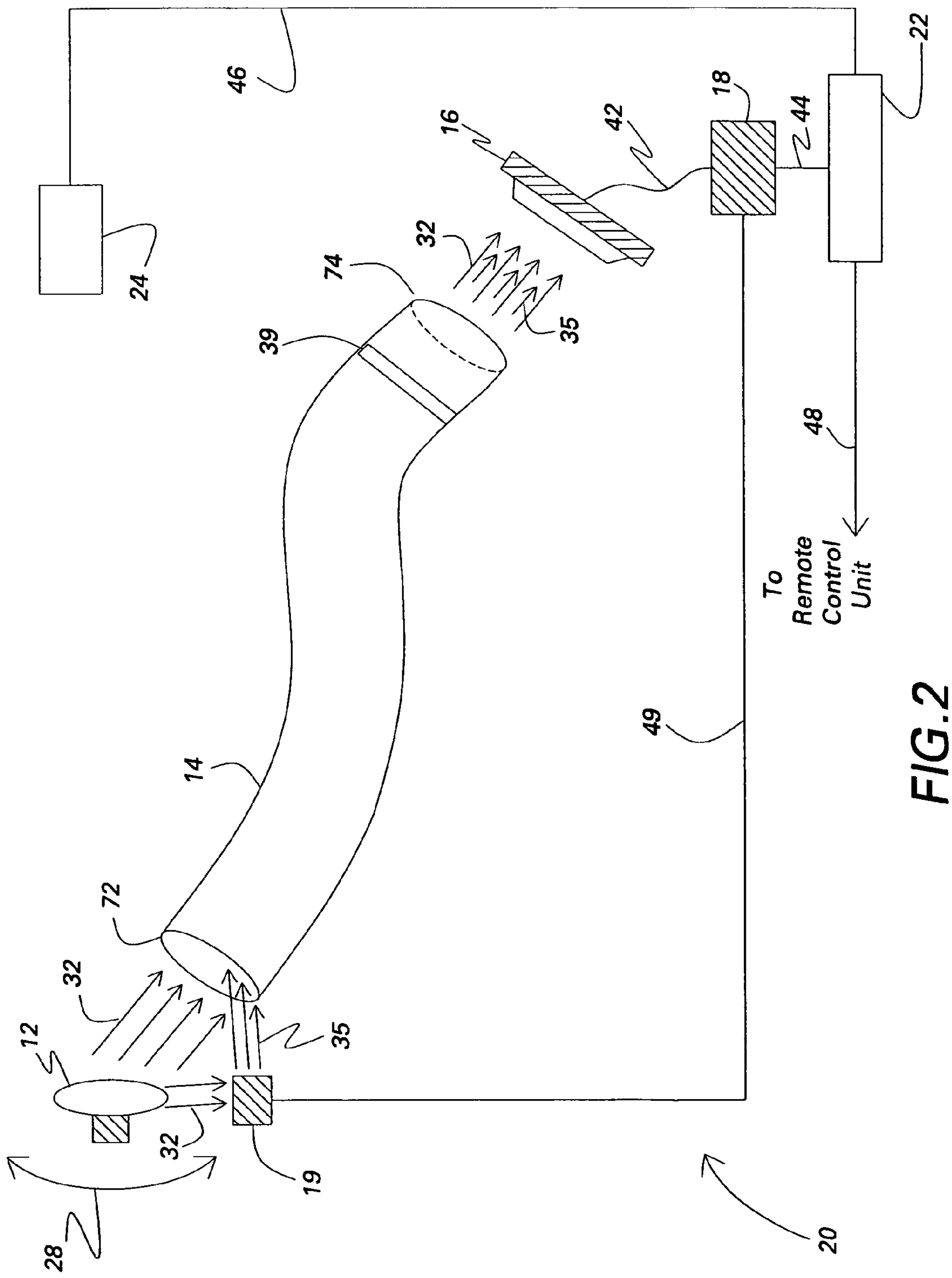
FIG. 2 is a schematic diagram of an exemplary system for monitoring status of visual signal lamp in accordance with a second embodiment of the invention.

FIG. 2 is a simplified schematic diagram of an exemplary system 20 for monitoring status of visual signal lamp 12 in accordance with a third embodiment of the invention. The system 20 is enhanced by the addition of a lamp-head voltage detection circuitry 19, an electrical conductor 49 that connects the lamp-head voltage detection circuitry 19 with the threshold detection circuitry 18 and a light frequency filter 39. Other than the lamp-head voltage detection circuitry 19, the conductor 49 and the light frequency filter 39, the system 20 is substantially similar to system 10 shown in FIG. 1. Components in system 20 that are identical to components of system 10 are identified in FIG. 2 using the same reference numerals used in FIG. 1.

Referring to FIG. 2, the lamp-head voltage detection circuitry 19 is located at the lamp-head (not shown) to measure the voltage directly. Positioning the lamp-head voltage detection circuitry 19 can be embodied in different ways. In one embodiment of the invention, the lamp-head voltage detection circuitry 19 is included in the threshold detection circuitry 18 and the threshold detection circuitry 18 and/or the logical processor 22 are positioned at the lamp-head. The lamp-head voltage detection circuitry 19 samples the lamp-head voltage and compares it with predetermined nominal thresholds or acceptable limits. If the lamp-head voltage is sensed to go beyond predetermined acceptable limits, the threshold detection circuitry 18 sends a signal to the logical processor 22. Logical processor 22 in turn processes the information coming from the threshold detection circuitry 18 and sends a signal to an alerting system 24 or to a remote locations as explained earlier.

In another embodiment of the invention, lamp-head voltage detection is accomplished by positioning the lamp-head voltage detection circuitry 19 proximate to the bulb of the signal lamp 12 and positioning the threshold detection circuitry 18 and/or the logical processor 22 at a remote location from the signal lamp 12. The lamp-head voltage detection circuitry 19 uses the lamp-head voltage as an input to generate light signals 35 which are placed in the optical fiber 14 along with the light signals 32 emitted by the signal lamp 12. The light signals 35 are amplitude modulated (on/off) signals at a frequency much higher than that of the light signals 32 coming from the signal lamp 12. This way, the two types of light signals 32 and 35 do not mix or interfere. At the second end 74 of the optical fiber 14, the two light signals 32 and 35 separated by using the light frequency filter 39. In another embodiment of this invention, the lamp-head voltage detection circuitry 19 uses the lamp-head voltage as an input to generate electrical signals 35 which are conducted through conductor 49 to the threshold detection circuitry 18. Measuring lamp-head voltage provides a benefit to railroad maintenance as it is required to be periodically inspected/measured. In addition, lamp-head voltage is an aid to diagnostics when combined and/or compared with other lighting parameters such as intensity levels, brightness, and irradiance of the signal lamp 12. For instance, detecting low lamp intensity and sufficient lamp-head voltage indicates a possible problem with the bulb or the reflector 28 or the lens of the signal lamp 12, while detecting low lamp voltage and low lamp intensity indicates another type of failure mode of the signal lamp 12.

Figure 3:
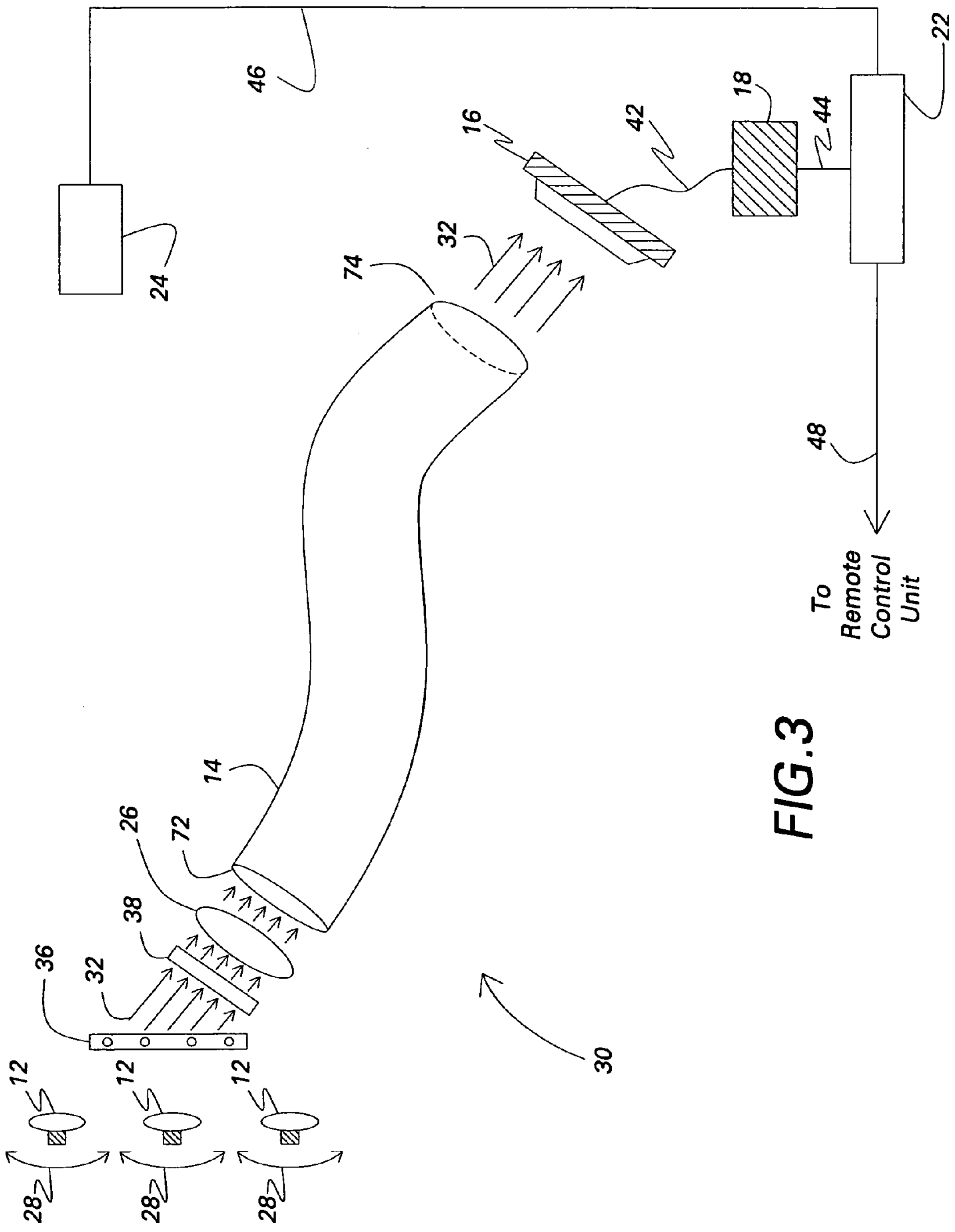
FIG. 3 is a schematic diagram of an exemplary system for monitoring status of visual signal lamp in accordance with a third embodiment of the invention.

FIG. 3 is a simplified schematic diagram of an exemplary system 30 for monitoring status of visual signal lamp 12 in accordance with a third embodiment of the invention. The system 30 is enhanced by the addition of a number of signal lamps 12, optical switch 36, a wavelength filter 38 and a lens 26. Other than the signal lamps 12, the optical switch 36, the wavelength filter 38 and the lens 26, the system 30 is substantially similar to system 10 shown in FIG. 1. Components in system 30 that are identical to components of system 10 are identified in FIG. 3 using the same reference numerals used in FIG. 1.

The optical switch 36 is a switch that enables signal lamps 12 to be selectively chosen for monitoring. The optical switch may be embodied in several ways, including mechanical, electro-optic, and magneto-optic embodiments. For instance, in certain mechanical embodiments, an optical fiber is mechanically shifted to drive one or more alternative fibers. In other embodiments, slow optical switches, such as those using moving sources, may be used for alternate routing of an optical transmission path. Fast optical switches, such as those using electro-optic or magneto-optic effects, are also suitable to perform logic operations. The optical switch 36 is controlled by a control unit (not shown) and a particular signal lamp 12 is selected for monitoring. In other instances, the optical switch 36 selects a particular signal lamp 12 for monitoring by an automatic polling algorithm that continues until a non-compliance with operating norms is detected.

Light signals 32 emanating from the selected signal lamp 12 pass through the wavelength filter 38. The wavelength filter 38 may be embodied in a wide range of filter types that are distinguished by the specific color spectrums and wavelengths they pass. As is commonly known in the art, color or wavelength filter glasses are identified by their selective absorption of optical light signal. In general, this grouping includes many filter types such as neutral density, short pass, long pass, band pass, ultraviolet, infrared, heat absorbing, and color temperature conversion filters. Wavelength filters 38 are used to keep out unwanted light from sources other than the signal lamp 12 the system 30 is monitoring. The specific range of the wavelengths that will be allowed to pass through the wavelength filters 38 depends on relevant applications. For instance, in this embodiment of the invention, only green, red, and yellow colors are allowed to pass through the wavelength filter 38 because in a standard railroad signal there are three signal lamps emitting lights of green or red or yellow colors only. Light signals of any color other than these three are interpreted as unwanted by the system 30 and the wavelength filters 38 do not allow these rays to pass through. Examples of such unwanted light signals include ultraviolet and infrared light signals generated by incandescent signal sources. Moreover, the wavelength filters also reduce ambient light from the sun.

Light signals 32 passing through the wavelength filter 38 are focused using the lens 26 before they enter the first end 72 of the optical fiber 14. The lens 26 is a common lens coupled to the first end 72 of the optical fiber 14. The lens 26 is designed to collect and focus light from the signal lamp 12. The filtered and focused light signals 32 coming from the signal lamp 12 are captured in the first end 72 of the optical fiber 14 and then transported through the optical fiber 14 to its second end 72. Continuing, the light signals 32 coming out of the second end 74 of the optical fiber 14 are radiated onto the photodetector 16, which quantifies the intensity of these light signals 32.

Referring to FIG. 3 again, the photodetector 16 is electrically coupled to the threshold detection circuitry 18, which in turn is connected to the logical processor 22. As described for previous embodiments, above, the logical processor 22 estimates a number of lighting parameters such as intensity, brightness, irradiance in relation to the signal lamp 12 and thereby the operating status of the signal lamp 12. The logical processor 22 reports its estimates to a control unit (not shown) via the electrical conductor 48 or to an alerting system 24 via an electrical conductor 46. If the sensed intensity of light signals 32 falls outside of the predetermined threshold, the logical processor 22 determines that the operating status of the signal lamp is not acceptable and the signal lamp 12 needs attention. In that event, the logical processor 22 sends an alarm signal to the alerting system 22 and the alerting system 22 in turn generates an appropriate alarm to a remote location (not shown). Otherwise, the operating status of the signal lamp 12 is determined by logically processing one or more lighting parameters such as brightness or intensity or irradiance of signal lamps 12 etc. In another embodiment of the invention, the logical processor 22 is programmed to keep track of the increase and decrease of the illumination caused by the flashing of the signal lamp 12. The logical processor 22, in this embodiment of the invention, also alerts the alerting system 24 when the flash rate goes beyond nominal and expected bounds.

Embodiments of the invention are not limited to the above-described configuration of the system 30 that includes the lens 26 and the optical fiber 14 with two normal ends 72 and 74. In a different embodiment of the invention, the lens 26 is omitted and instead, the first end 72 of the optical fiber 14 is configured as a 'lensed end'. Moreover, the lensed end optical fiber 14 eliminates the need for a separate lens 26 and thereby reduces return loss.

Figure 4:
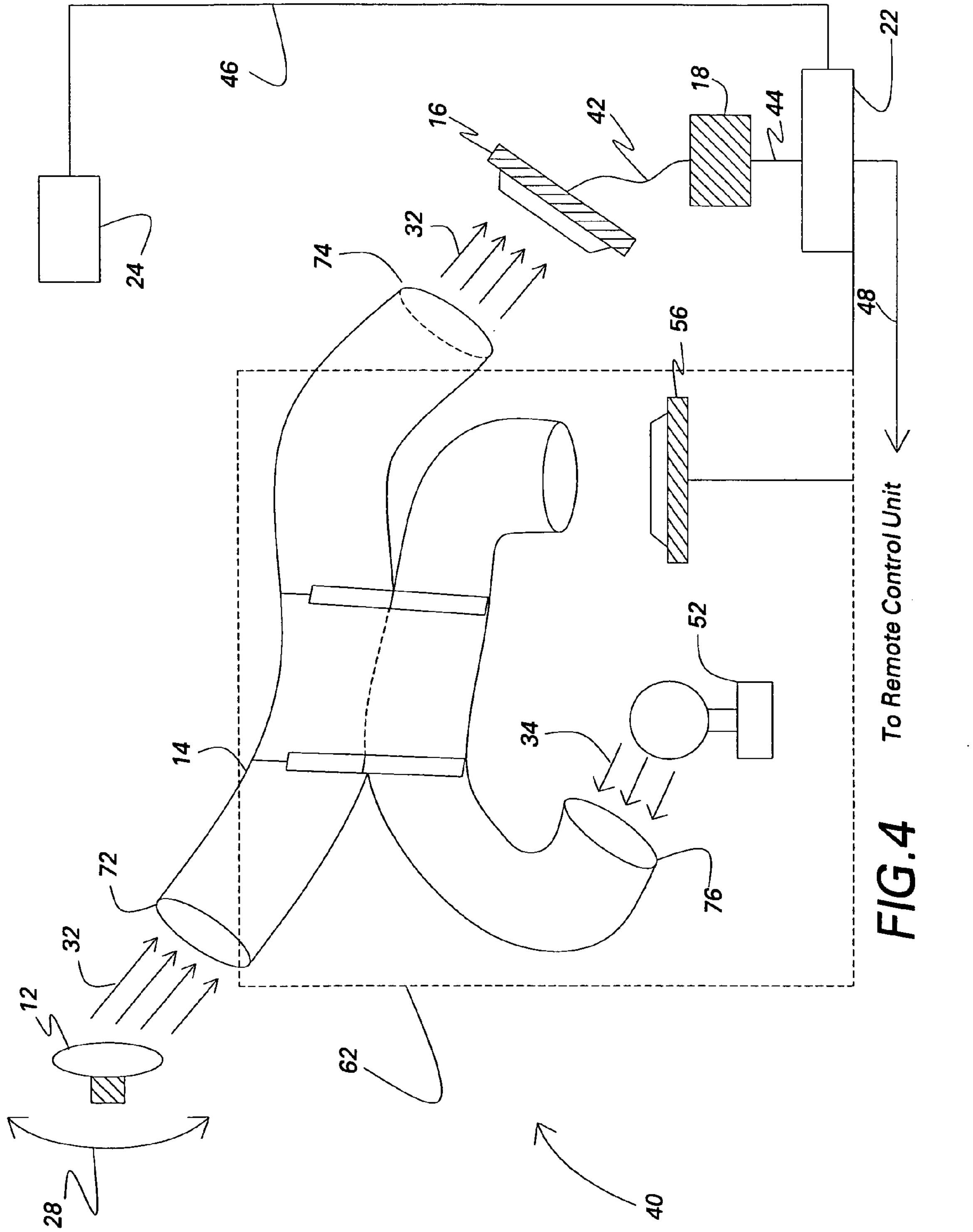
FIG. 4 is a schematic diagram of an exemplary system for monitoring status of visual signal lamp in accordance with a fourth embodiment of the invention.

FIG. 4 is a simplified schematic diagram of an exemplary system 40 for monitoring status of visual signal lamp 12 in accordance with a fourth embodiment of the invention. The system 40 is enhanced by the addition of a continuity checking circuitry 62 to check the continuity of the optical fiber 14. The continuity checking circuitry 62 includes a test optical light source 52, a test photodetector 56, a test optical fiber 54 and two fiber optic splitters 64 and 66. Other than the test optical light source 52, the test photodetector 56, the test optical fiber 54 and the two fiber optic splitters 64 and 66, system 40 is substantially similar to system 10 shown in FIG. 1. Components in system 40 that are identical to components of system 10 are identified in FIG. 4 using the same reference numerals used in FIG. 1.

The continuity checking circuitry 62 is used for checking the continuity of optical fiber 14 used to monitor the status of one or more signal lamps 12. The continuity checking circuitry 62 is located at or proximate to the site of measurement and it houses the single test photodetector 56 or a number of photodetectors 56 for monitoring the status of the test optical signal source 52. The test optical light source 52 emits light signals 34 that enter the first end 76 of the test optical fiber 52. In a standalone mode of operation of the continuity checking circuitry 62, a portion of the light signals 34 coming out from the test light source 52 enter the first end 76 of the optical fiber 54 and are then transported by the optical fiber 54 to its second end 78. The light signals 34 coming out from the second end 78 of the test optical fiber 54 are then radiated onto the test photodetector 56. However, in the embodiment of the invention, as described in FIG. 4, the continuity checking circuitry 62 and the test optical fiber 54 are not configured to operate in standalone mode. The test optical fiber 54 on the contrary, is optically coupled with first optical fiber 14 as shown in FIG. 4 using two fiber optic splitters 64 and 66.

Fiber optic splitters 64 and 66, also known as fiber optic couplers, are optical devices that split light from one fiber into multiple fibers, or combine light from more than one fiber into a fewer number of fibers. Fiber optic splitters typically divide one input between two or more outputs, or combine two or more inputs into one output. There are many suitable splitters and they are well known to those of ordinary skill in the art. The cable type compatible with fiber optic splitters 64 and 66 can be single mode or multimode in configuration. Single mode describes an optical fiber that will allow only one mode to propagate. It permits signal transmission at extremely high bandwidth and allows very long transmission distances. Multimode describes an optical fiber that supports the propagation of multiple modes. It allows the use of inexpensive LED light sources and connector alignment and this type of coupling is less critical than single mode fiber. Typically, distances of transmission and transmission bandwidth are less with single mode fiber than with multimode due to dispersion. Different embodiments of fiber optic splitters 64 and 66 include single window, dual window, or wideband. Single window splitters are designed for a single wavelength with a narrow wavelength window. Dual wavelength splitters are designed for two wavelengths with a wide wavelength window for each. Wideband splitters are designed for a single wavelength with a wider wavelength window.

Referring back to FIG. 4, the first fiber optic splitter 64 is positioned at the first coupling joint of the first optical fiber 14 and the test optical fiber 54. First optic splitter 64 combines the light signals 32 coming from the signal lamp 12 through the first optical fiber 14 and the light signals 34 coming from the test light source 52 through the test optical fiber 54. The combined light signal passes through the coupled part of the first optical fiber 14 and the test optical fiber 54. At the end of this coupled part, and at the second coupling joint of the first optical fiber 14 and the test optical fiber 54, the second fiber optic splitter 66 is positioned. Second fiber optic splitter 66 divides the light signals into two portions as shown in FIG. 3. One portion 34 of the light signals is sent out through the second end 78 of the test optical fiber 54 and the other portion 32 of the light signals is sent out through the second end 74 of the first optical fiber 14. The outgoing portion of light signals 32 is radiated onto the photodetector 16. In a similar manner, the outgoing portion of light signals 32 is radiated onto the test photodetector 56.

Referring to FIG. 4 again, the output of the test photodetector 56 is sent to and analyzed by the logical processor 22 to determine whether optical source 52 is detectable. If optical source 52 is not detectable and the optical source 52 is verified to be operating properly, then that suggests a possible cut in the optical fiber 14. In that event, the logical processor 22 sends an alarm to the alerting system 24. Otherwise, the optical fiber 14 is determined to be continuous and operating in good condition. In the event of a continuous optical fiber 14, the light signals 32 from the signal lamp 12 are detected and analyzed per the description provided previously.

Embodiments of the present invention utilizing flashing lamps in railroad applications are described above, but the invention is useful in other environments as well. For example, embodiments of the invention can be used to detect status of signal lamps when lamps 12 are used in flashing obstruction lighting such as that used on towers or buildings.

Figure 5:
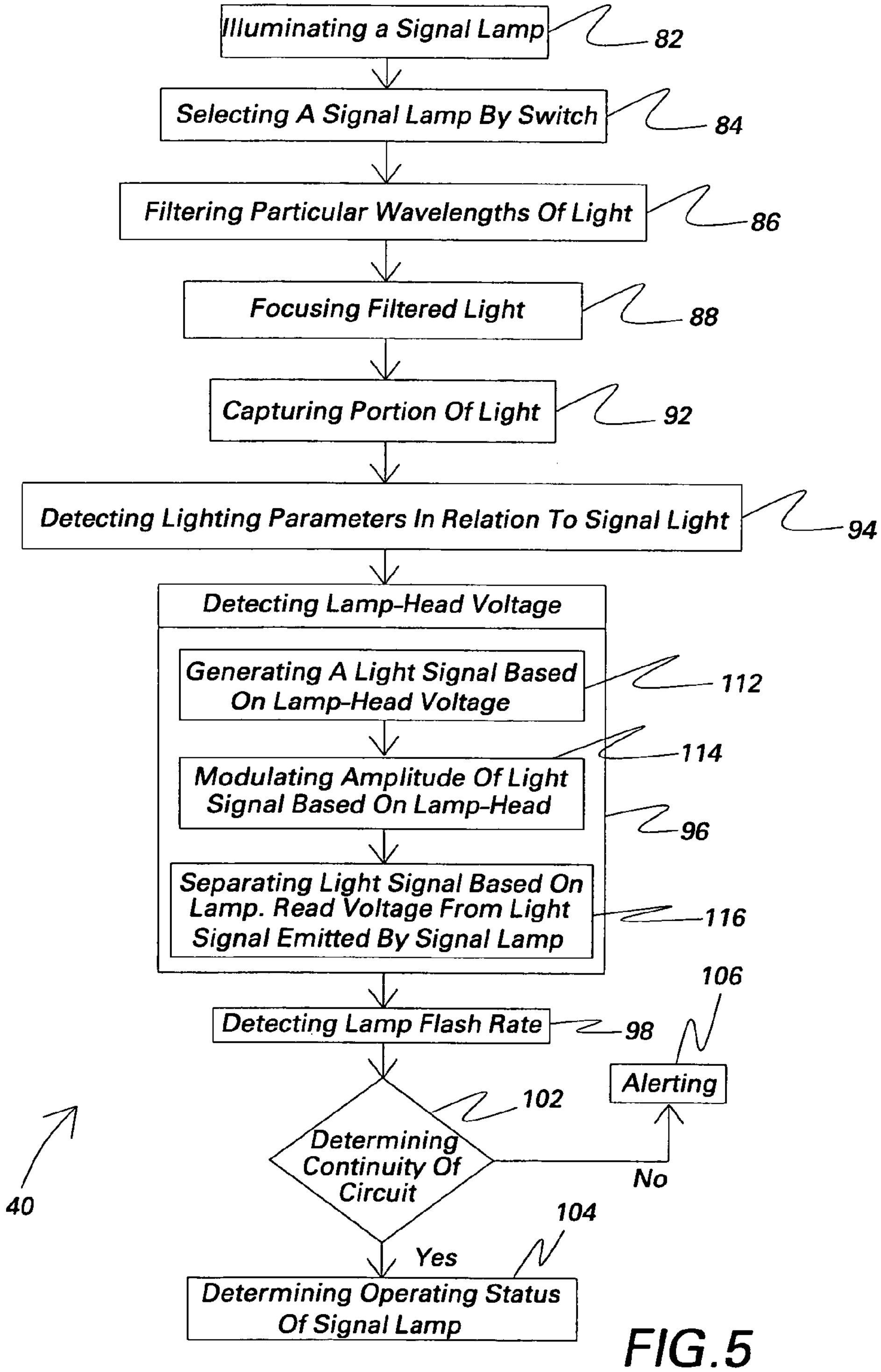
FIG. 5 illustrates a method for monitoring status of visual signal lamp in accordance with one embodiment of the invention.

FIG. 5 illustrates an exemplary method for monitoring status of visual signal lamp in accordance with one embodiment of the invention. To this end, beginning at block 82, a signal lamp is illuminated and at block 84, the signal lamp is selected for monitoring using a switch. There is an optical fiber 14 with its first end positioned near the signal lamp. Light emanating from the signal lamp enters the first end of the optical fiber 14 and is transported by the optical fiber 14 to its second end. Before the incoming light enters the first end of the optical fiber, a wavelength filter may be used so that only a predetermined range of wavelengths is allowed to pass through the optical fiber 14 as in block 86. In addition, before the incoming light enters the first end of the optical fiber it is focused using a lens as illustrated in block 88. Thus, the filtered and focused light from the signal lamp is captured in the first end of the optical fiber as illustrated in block 92 and transported through the optical fiber 14 to its second end. Continuing, in block 94, a number of lighting parameters such as intensity, brightness, and irradiance in relation to the signal lamp 12 are detected using a photodetector. The lamp-head voltage is detected as in block 98. Detecting lamp-head voltage includes generating a light signal based on the lamp-head voltage as in block 112, modulating amplitude of the light signal based on lamp-head voltage as in block 114 and separating the light signal generated based on lamp-head voltage from light signal emitted by signal lamp as in block 116. Continuing, another lighting parameter—the flash rate of the lamp is detected as in block 98. At the same time, the continuity of the optical fiber circuitry is determined as in block 102. If the optical fiber circuitry is detected to be continuous, the operating status of the signal lamp is determined by logically processing the determined lighting parameters such as intensity, brightness, irradiance in relation to the signal lamp 12 or the flash rate of the light coming from the signal lamp or the lamp-head voltage of the signal lamp as in block 104. Otherwise, if a break in continuity of the optical fiber circuitry is determined, an alarm is sent to a monitoring unit as in block 106.

While only certain features of the invention have been illustrated and described herein, many modifications and changes will occur to those skilled in the art. It is, therefore, to be understood that the appended claims are intended to cover all such modifications and changes as fall within the true spirit of the invention

The invention claimed is:

1. A system for monitoring status of a visual signal lamp comprising:

at least one optical fiber comprising a first end and a second end, said first end positioned proximate to said signal lamp and oriented to capture a portion of light signal emitted by said signal lamp when said signal lamp is illuminated;

a photodetector positioned proximate to said second end and configured to receive said portion of light signal;

a threshold detection circuitry connected to said photodetector and configured to detect a lighting parameter in relation to said signal lamp according to a predetermined criterion; and a continuity checking circuitry configured to check continuity of said at least one optical fiber.

2. The system according to claim 1, wherein said photodetector comprises at least one selected from the group consisting of a photodiode, a phototransistor, a photomultiplier, and combinations thereof.

3. The system according to claim 1 wherein said first end comprises a lens.

4. The system according to claim 1 wherein said lamp is enclosed in a lamp housing and said first end is positioned external to said housing.

5. The system according to claim 1 wherein said lamp is enclosed in a lamp housing and said first end is positioned internal to said housing.

6. The system according to claim 1 further comprising at least one lens positioned between said signal lamp and said first end of said optical fiber and configured to focus said light signal emitted by said signal lamp.

7. The system according to claim 1 further comprising at least one wavelength filter positioned between said signal lamp and said first end of said optical fiber and configured to pass a light signal having a wavelength within a predetermined range.

8. The system according to claim 7, wherein said predetermined range comprises range of wavelength corresponding to at least one selected from the group consisting of red, yellow, green colors, and any combination thereof.

9. The system according to claim 1, wherein said lighting parameter comprises at least one selected from the group consisting of an intensity of light signal emitted by said signal lamp, a voltage across a lamp-head of said signal lamp, a flash rate of said signal lamp, and any combination thereof.

10. The system according to claim 9, further comprising a lamp-head voltage detection circuitry configured to detect said voltage across said lamp-head of said signal lamp or a flash rate of said signal lamp.

11. The system according to claim 10, further comprising a light frequency filter configured to separate a light signal from said lamp-head voltage detection circuitry from said portion of light signal emitted by said signal lamp.

12. The system according to claim 1 further comprising a logical processor connected to said threshold detection circuitry and configured to determine a status of said signal lamp based on said lighting parameter.

13. The system according to claim 12, wherein said predetermined criterion comprises a binary condition for detection of said portion of light signal received by said photodetector.

14. The system according to claim 12, wherein said predetermined criterion comprises a maximum threshold for detection of said portion of light signal received by said photodetector.

15. The system according to claim 12, wherein said predetermined criterion comprises a minimum threshold for detection of said portion of light signal received by said photodetector.

16. The system according to claim 12 further comprising an alerting system, wherein said logical processor is configured to send an alarm signal to said alerting system when there is a determined change in status of said signal lamp.

17. The system according to claim 1, wherein said continuity checking circuitry comprises:

at least one additional optical fiber comprising a first end and a second end, wherein said additional optical fiber is coupled to said at least one optical fiber;

a light source positioned proximate to said first end of said at least one additional optical fiber and configured to emit light signal through said additional optical fiber;

a fiber optic splitter coupled to said first end of said at least one additional optical fiber and configured to split a light signal emitted by said light source such that one portion of said light signal passes through said at least one additional optical fiber and another portion of said light signal passes through said at least one optical fiber; and an additional photodetector positioned proximate to said second end of said at least one additional optical fiber.

18. A system for monitoring status of a visual signal lamp comprising:

at least one optical fiber comprising a first end and a second end, said first end positioned proximate to said signal lamp and oriented to capture a portion of light signal emitted by said signal lamp when said signal lamp is illuminated;

a continuity checking circuitry configured to check continuity of said at least one optical fiber;

a photodetector positioned proximate to said second end and configured to receive said portion of light signal, wherein said photodetector comprises at least one selected from the group consisting of a photodiode, a phototransistor, a photomultiplier, and combinations thereof, a threshold detection circuitry connected to said photodetector and configured to detect a lighting parameter in relation to said signal lamp according to a predetermined criterion, wherein said lighting parameter comprises at least one selected from the group consisting of an intensity of light signal emitted by said signal lamp, a voltage across a lamp-head of said signal lamp, a flash rate of said signal lamp, and any combination thereof;

a logical processor connected to said threshold detection circuitry and configured to determine a status of said signal lamp based on said lighting parameter; and an alerting system, wherein said logical processor is configured to send an alarm signal to said alerting system when there is a determined change in status of said signal lamp.

19. A visual signal system comprising:

at least one signal lamp;

at least one first optical fiber comprising a first end and a second end, wherein said first end is positioned proximate to said signal lamp and oriented to capture a portion of light signal emitted by said signal lamp when said signal lamp is illuminated;

a photodetector positioned proximate to said second end of said first optical fiber and configured to receive said portion of light signal;

a continuity checking circuitry coupled to said first optical fiber and configured to check an continuity of said at least one first optical fiber; and a threshold detection circuitry connected to said photodetector and configured to detect a lighting parameter in relation to said signal lamp according to a predetermined criterion.

20. The system according to claim 19, wherein said photodetector comprises at least one selected from the group consisting of a photodiode, a phototransistor, a photomultiplier, and any combination thereof.

21. The system according to claim 19, wherein said at least one signal lamp comprises a plurality of signal lamps.

22. The system according to claim 19 further comprising at least one optical switch positioned proximate to said first end of said optical fiber and configured to select at least one of said plurality of signal lamps for determining said status of.

23. The system according to claim 19, wherein said first end comprises a lens.

24. The system according to claim 19, wherein said first end is positioned external to a lamp housing enclosing said lamp.

25. The system according to claim 19, wherein said first end is positioned internal to a lamp housing enclosing said lamp.

26. The system according to claim 19 further comprising at least one lens positioned between said signal lamp and said first end of said optical fiber and configured to focus said light signal emitted by said signal lamp.

27. The system according to claim 19 further comprising at least one wavelength filter positioned between said signal lamp and said first end of said optical fiber and configured to pass a light signal having a wavelength within a predetermined range.

28. The system according to claim 26, wherein said predetermined range comprises range of wavelength corresponding to at least one selected from the group consisting of red, yellow, green colors, and any combination thereof.

29. The system according to claim 19, wherein said lighting parameter comprises at least one selected from the group consisting of an intensity of light signal emitted by said signal lamp, a voltage across a lamp-head of said signal lamp, a flash rate of said signal lamp, and any combination thereof.

30. The system according to claim 29, further comprising a lamp-head voltage detection circuitry configured to detect said voltage across said lamp-head of said signal lamp or a flash rate of said signal lamp.

31. The system according to claim 30, Further comprising a light frequency filter configured to separate a light signal from said lamp-head voltage detection circuitry from said portion of light signal emitted by said signal lamp.

32. The system according to claim 19 further comprising a logical processor connected to said threshold detection circuitry and configured to determine a status of said signal lamp based on said lighting parameter.

33. The system according to claim 32, wherein said predetermined criterion comprises a binary condition for detection of said portion of light signal received by said photodetector.

34. The system according to claim 32, wherein said predetermined criterion comprises a maximum threshold of said portion of light signal received by said photodetector.

35. The system according to claim 19, wherein said predetermined criterion comprises a minimum threshold of said portion of light signal received by said photodetector.

36. The system according to claim 19 further comprising an alerting system, wherein said logical processor is configured to send an alarm signal to said alerting system when there is a determined change in status of said signal lamp.

37. The system according to claim 19, wherein said continuity checking circuitry further comprises:
- at least one test optical fiber comprising a first end and a second end, wherein said test optical fiber is coupled to said at least one optical fiber;
- a light source positioned proximate to said first end of said at least one test optical fiber;
- a fiber optic splitter coupled to said first end of said at least one test optical fiber and configured to split a light signal emitted by said light source such that one portion of said light signal passes through said at least one additional optical fiber and another portion of said light signal passes through said at least one optical fiber; and
- a test photodetector positioned proximate to said second end of said at least one test optical fiber and configured to detect said light signal emitted from said light source.

38. A method for monitoring status of a visual signal lamp comprising:
- positioning at least one optical fiber proximate to said signal lamp and orienting said at least one optical fiber to capture a portion of light signal emitted by said signal lamp when said signal lamp is illuminated;
- checking continuity of said at least one optical fiber;
- capturing a portion of light signal emitted by said signal lamp using said at least one optical fiber when said signal lamp is illuminated; and
- detecting a lighting parameter in relation to said signal lamp according to a predetermined criterion.

39. The method according to claim 38, wherein said detecting comprises detecting using a photodetecting.

40. The method according to claim 38, wherein said lighting parameter comprises at least one selected from the group consisting of an intensity of light signal emitted by said signal lamp, a voltage across a lamp-head of said signal lamp, a flash rate of said signal lamp, and any combination thereof.

41. The method according to claim 40, further comprising generating a light signal based on said voltage across said lamp-head.

42. The method according to claim 41, further comprising modulating an amplitude of said light signal based on said voltage across said lamp-head.

43. The method according to claim 41, further comprising separating said light signal based on said voltage across said lamp-head from said portion of light signal emitted by said signal lamp.

44. The method according to claim 43, wherein said separating comprises separating using a light frequency filter.

45. The method according to claim 38 further comprising determining a status of said signal lamp based on said lighting parameter using a logical processor.

46. The method according to claim 45, wherein said predetermined criterion comprises comparing said intensity of said portion of light signal to a predetermined threshold detection value using a binary condition.

47. The method according to claim 45, wherein said predetermined criterion comprises comparing said intensity of said portion of light signal to a predetermined maximum value of intensity as threshold for detection of said intensity of said portion of light signal.

48. The method according to claim 45, wherein said predetermined criterion comprises comparing said intensity of said portion of light signal to a predetermined minimum value of intensity as threshold for detection of said intensity of said portion of light signal.

49. The method according to claim 38, wherein said lamp is enclosed in a lamp housing and said capturing said portion of light signal comprises capturing outside said housing.

50. The method according to claim 38, wherein said lamp is enclosed in a lamp housing and said capturing said portion of light signal comprises capturing inside said housing.

51. The method according to claim 38 further comprising passing a light signal having a wavelength within a predetermined range using a wavelength filter before said capturing.

52. The method according to claim 51, wherein said passing said light signal comprises passing a light signal having a wavelength within a range of wavelength corresponding to at least one selected from the group consisting of red, yellow, green colors, and any combination thereof.

53. The method according to claim 38 further comprising focusing said light signal emitted by said signal lamp before said capturing.

54. The method according to claim 38 further comprising sending an alarm signal when said change in status of said signal lamp is determined.

55. The method according to claim 38, wherein said checking continuity further comprises:
- coupling at least one additional optical fiber comprising a first end and a second end to said at least one optical fiber;
- sending a test light signal through said first end of said additional optical fiber;
- splitting said test light signal emitted by said light source such that one portion of said test light signal passes through said at least one additional optical fiber and another portion of said test light signal passes through said at least one optical fiber; and
- detecting said another portion of said test light signal coming out through said second end of said additional optical fiber.

* * * * *